United States Patent
Fraser et al.

(10) Patent No.: US 6,269,718 B1
(45) Date of Patent: Aug. 7, 2001

(54) ENGRAVING HEAD SUPPORT METHOD WITH LINEAR HEAD DRIVER

(75) Inventors: John W. Fraser, Dayton; Kenneth F. Bornhorst, Jr., Centerville; Thomas J. Eichhorn, Beavercreek; Robert D. Likins, Wilmington, all of OH (US)

(73) Assignee: MDC Max Daetwyler AG (CH)

( * ) Notice: Subject to any disclaimer, the term of this patent is extended or adjusted under 35 U.S.C. 154(b) by 0 days.

(21) Appl. No.: 09/054,197

(22) Filed: Apr. 2, 1998

Related U.S. Application Data

(63) Continuation of application No. 08/474,104, filed on Jun. 7, 1995, now Pat. No. 5,767,981, which is a continuation of application No. 08/091,302, filed on Jul. 12, 1993, now Pat. No. 5,454,306.

(51) Int. Cl.⁷ .................................................. B23B 1/00
(52) U.S. Cl. ........................... 82/1.11; 82/11.1; 82/47; 82/154
(58) Field of Search ................... 82/1.11, 11.1, 82/11.2, 11.3, 17, 48, 47, 153, 154, 133

(56) References Cited

U.S. PATENT DOCUMENTS

| | | |
|---|---|---|
| 2,079,970 | 5/1937 | Speed . |
| 3,202,024 * | 8/1965 | Findley ................................. 82/11.1 |
| 3,309,950 * | 3/1967 | Weaver ................................. 82/11.1 |
| 3,373,640 * | 3/1968 | Allen et al. .......................... 82/17 X |
| 3,425,303 * | 2/1969 | Buckley ................................ 82/11.1 |
| 3,716,668 | 2/1973 | Barron .................................. 178/6.6 |
| 3,834,256 | 9/1974 | Abbatiello et al. ...................... 82/21 |
| 3,885,481 * | 5/1975 | Okada et al. ........................ 82/11.1 |
| 3,964,382 | 6/1976 | Baar et al. ........................... 358/299 |
| 3,983,770 * | 10/1976 | Skrentner et al. ................ 82/11.1 X |
| 4,440,530 | 4/1984 | Yamakage ............................... 408/3 |
| 4,450,486 | 5/1984 | Buechler ............................. 358/299 |
| 4,591,279 | 5/1986 | Speicher ............................. 400/121 |
| 4,802,156 | 1/1989 | Shyu et al. .......................... 369/132 |
| 4,805,312 | 2/1989 | Datwyler .............................. 33/18.1 |
| 4,830,552 | 5/1989 | Ryf ..................................... 409/103 |
| 4,831,785 | 5/1989 | Sigg ..................................... 51/165 |
| 4,898,485 | 2/1990 | Speicher ............................. 400/121 |
| 4,972,323 | 11/1990 | Cauwet ............................... 364/474 |
| 5,029,011 | 7/1991 | Fraser ................................. 358/299 |
| 5,719,683 * | 2/1998 | Yodhida ............................. 358/299 |

OTHER PUBLICATIONS

Japanese "Printing Technology Handbook," 2000–72393, pp. 537–539 published May 1, 1983, Giho–Dou Publishing Co. with English translation.

"Helio–Klischograph K201 and K202 Programmierte Zylinderherstellung fur den Tiefdruck," Dr.–Ing. Rudolf Hell GmbH, undated, with English translation.

"Heli–Klischograph K304, K305," Dr. Ing. Rudolf Hell GmbH, undated, with English translation.

Documentation for a Burr Cutter and Electron Beam Arrangement, published by Dr. Ing. Rudolf Hell, GmbH, Federal Republic of Germany, Mar. 3, 1981.

(List continued on next page.)

Primary Examiner—Henry Tsai
(74) Attorney, Agent, or Firm—Jacox, Meckstroth & Jenkins

(57) ABSTRACT

A platform for supporting an engraving head in a manner accommodating translational movement without any associated rotation. The platform has a deck which is supported by a pair of flexible support columns. In operation the platform is situated alongside a rotating printing cylinder. The engraving head is mounted on the deck of the platform and is provided with a guide shoe which rides against the surface of the printing cylinder. As the cylinder rotates to angular positions having different radii, the engraving head responds with a purely linear reaction. Consequently the engraving head is able to engrave uniform-depth cavities in the surface of the printing cylinder. In two alternative embodiments the deck is driven by a resilient link arrangement which is coupled to a leadscrew and carriage assembly.

26 Claims, 7 Drawing Sheets

OTHER PUBLICATIONS

"Turning Chrome", Technical data and Constructional Features, Maschinenfabrik, Kaspar Walter GmbH & Co. KG, Plingaserstrasse 22 800 Munchen 70, Germany, undated.

Miscellaneous Drawings regarding various Linotype–Hell machines, undated.

"Helio–Klischograph–Precision Engraving in Copper", Dr. Ing. Rudolf Hell GmbH, P.O. Box 6229, D–2300 Kiel 14, Germany, undated.

"HelioKlischograph K301 and K302 for Magazine Gravure Printing", Dr. Ing. Rudolf Hell GmbH, P.O. Box 6 229, D–2300 Kiel 14, Germany, undated.

"HelioKlischograph K304–for Pacaging and Product Gravure Printing", Dr. Ing. Rudolf Hell GmbH, P.O. Box 6229, D–2300, Kiel. Germany, undated.

"HelioKlischograph K305–the Engraving Machine", Dr. Ing. Rudolf Hell GmbH, P.O. Box 6229, D–2300 Kiel 14, Germant, undated publication.

"Helio–Klischograph K 193", Operating Manual 193– Ble—6905, Dr. Ing. Rudolf Hell GmbH, P.O. 6229, D–2300 Kiel 14, Germany, undated.

"Martin Galvanotechnik Galvanoplastic Plating", R.G. Martin AG, CH–4106 Therwil, Erlenstrasse 50, Switzerland, undated brochure.

"Think Boomerang System", Rotogravure Cylinder Making System, Fujitoku Co., Tsukuba, Japan, undated brochure.

"Magnetic Antriebstichnik", Magnetic Elektromotoren AG, PO Box 267, CH–4410 Liestal, Switzerland, undated brochure.

"Valcus" Screen brochure, Sep. 1993.

"Datwyler", Max Daetwyler Corporation, 13420 West Reese Blvd., Huntersville, NC 28078, Feb. 1992.

"Twin–Pilot", Maschinenfabrik Kaspar Walter GmbH & Co. KG, Plingaserstrasse 22, 8000 Munchen 70, Germany, undated brochure.

Catalog PZ 37E of Physik Instruments entitled "Piezo Guide", Piezo Positioning Technology Part 1.

"Electron Beam Engraving from Hell for Manufacturing Gravure Cylinders" by Wolfgang Boppel, Dr.–Ing. Rudolf Hell GmbH, Postfach 62 29, D–2300 Kiel 14, undated brochure.

"High Speed Electron Beam Engraving Method or Procedure for Engraving of Metal Cylinders", by Wolfgang Boppel, *Optic 77*, No. 2, Scientific Publication Company GmbH, Stuttgart, Germany 1987, 21 pages.

* cited by examiner

US 6,269,718 B1

ENGRAVING HEAD SUPPORT METHOD WITH LINEAR HEAD DRIVER

CROSS-REFERENCE TO RELATED APPLICATION

This application is a continuation of Ser. No. 08/474,104, filed Jun. 7, 1995 now U.S. Pat. No. 5,767,981, which is a continuation of Ser. No. 08/091,302, filed Jul. 12, 1993, now U.S. Pat. No. 5,454,306.

BACKGROUND OF THE INVENTION

This invention relates to electronic engraving devices for engraving ink-receiving cavities into the surface of a gravure printing cylinder. Such engraving devices commonly comprise an engraving head which includes a diamond stylus and a guide shoe. The guide shoe bears against the printing cylinder and provides a reference surface for the engraving process. An electromagnetic driver is mounted within the engraving head for oscillating the stylus into engraving contact with the printing cylinder. Meanwhile the printing cylinder rotates about its cylindrical axis. The engraving head is supported such that it moves parallel to the axis of the printing cylinder in synchronism with printing cylinder rotation. A typical prior art device is shown in Buechler U.S. Pat. No. 4,450,486.

A prior art device of the type disclosed in the Buechler patent supports the engraving head in a manner generally as illustrated in FIG. 1 hereof. Thus an engraving head 12 supports a guide shoe 13 against a print cylinder 10 which is rotating in the direction indicated by the arrow 11. Engraving head 12 rests upon a deck 16 which in turn is supported by a base 20. Base 20 is horizontally moveable as indicated by the arrow 15, while deck 16 is rotatable about an axis 18. Rotation of deck 16 about axis 18 produces rotational movement of engraving head 12 as indicated by the arrow 93. A diamond engraving stylus (not illustrated in FIG. 1) is mounted alongside guide shoe 13 and is brought into engraving contact against cylinder 10 by a combination of translational motion and rotary motion. During setup the rotational position angle of engraving head 12 is adjusted so as to align the guide shoe and engraving stylus to the cylinder surface and produce a desired printing cell depth for a predetermined stylus driving signal. Unfortunately the rotation of engraving head 12 changes the orientation of the stylus as well as its cutting depth. This produces unwanted engraving errors.

It is therefore seen that there is a need for engraving head support means capable of positioning a stylus against a printing cylinder by translational motion only.

SUMMARY OF THE INVENTION

In an engraving apparatus according to the present invention an engraving head translates a stylus, without rotation, into engraving contact with a rotating printing cylinder. The engraving head is mounted on a platform comprising a deck and a base joined by connection means which permit the deck to move relative to the base only by translation within a plane perpendicular to the axis of the printing cylinder. In one embodiment the connection means comprise a pair of parallel support columns. The support columns may be deflected in parallel fashion to enable movement of the deck relative to the base. However, the deck remains parallel to the base at all times. The engraving head rests on the deck and cannot rotate relative to the printing cylinder.

Preferably the support columns are secured fast to the deck and the base and accommodate translation of the deck by parallel flexing. The flexing occurs within a plane perpendicular to the axis of rotation of the printing cylinder, and a parallel relation between the deck and the base is maintained. The platform is so constructed as to prevent relative movement between the deck and the base in a direction parallel to the axis of the printing cylinder.

In alternate embodiments the connection means comprise a carriage driven by a motor and a leadscrew which are mounted in the base. A resilient link arrangement couples the carriage to the deck.

DESCRIPTION OF THE PREFERRED EMBODIMENT

Figure 2:
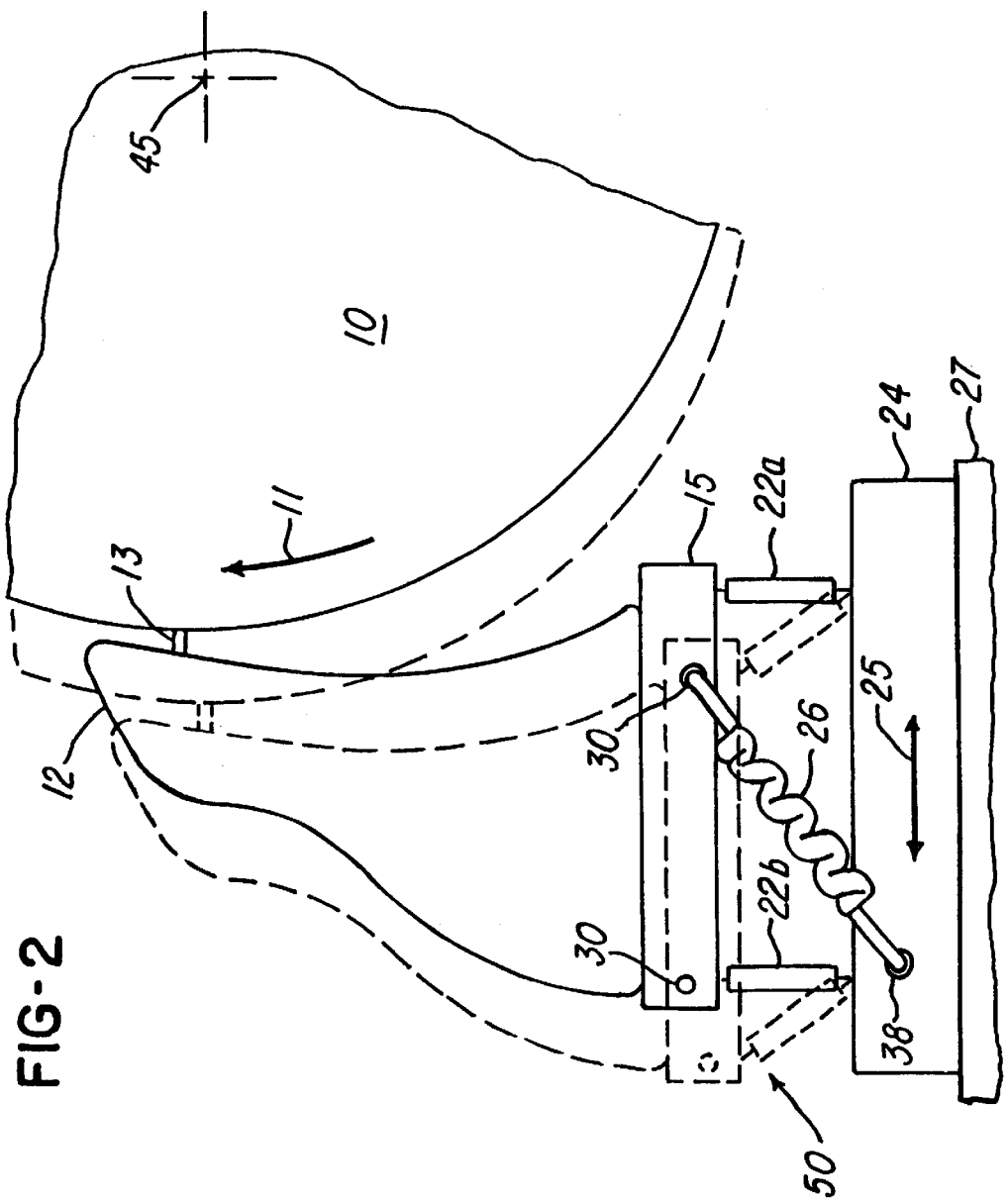
FIG. 2 is a side elevation sketch of a support arrangement for an engraving head according to the present invention.

A support platform 50 according to the present invention may be configured as illustrated generally in FIG. 2. Platform 50 supports an engraving head 12 for translational movement between a position illustrated in solid lines and another position illustrated in dotted lines. A bias mechanism, such as a compression spring 26, urges engraving head 12 toward a normal operating position wherein a guide shoe 13 is in surface-to-surface contact with printing cylinder 10. A second such compression spring may be installed at the remote end of platform 50. The movement is two-dimensional and parallel; no rotation being permitted. The plane of movement is perpendicular to the axis of rotation 45 of printing cylinder 10. Referring now to FIG. 4, there is shown a top plan view of an engraving stylus 14 and a guide shoe 13. When guide shoe 13 is ideally positioned, as illustrated in FIG. 4, it contacts printing cylinder along a contact line 34. Cutting tip 98 of stylus 14 cuts into printing cylinder 10 along an extension of contact line 34. The engraving action thereof is illustrated in FIG. 4a.

Figure 4A:
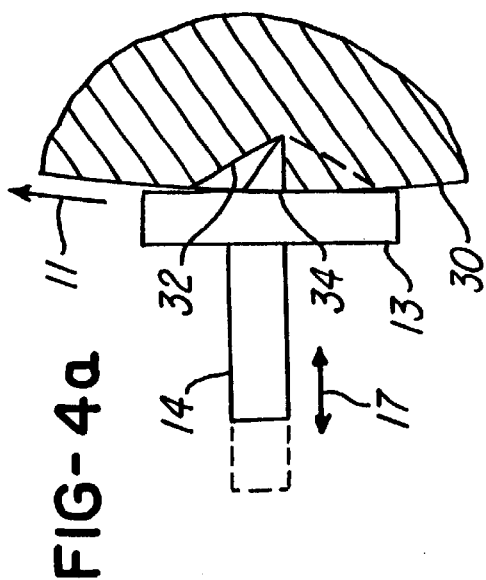
FIG. 4a is a schematic illustration of the engraving action of the present invention.

As shown in FIG. 4a, cutting tip 98 oscillates in the direction of the double headed arrow 17 so as to cut into the surface 30 of printing cylinder 10. Printing cylinder 10 moves in a direction as indicated by the arrow 11, and the oscillating stylus cuts a channel indicated by the profile 32.

Figure 1:
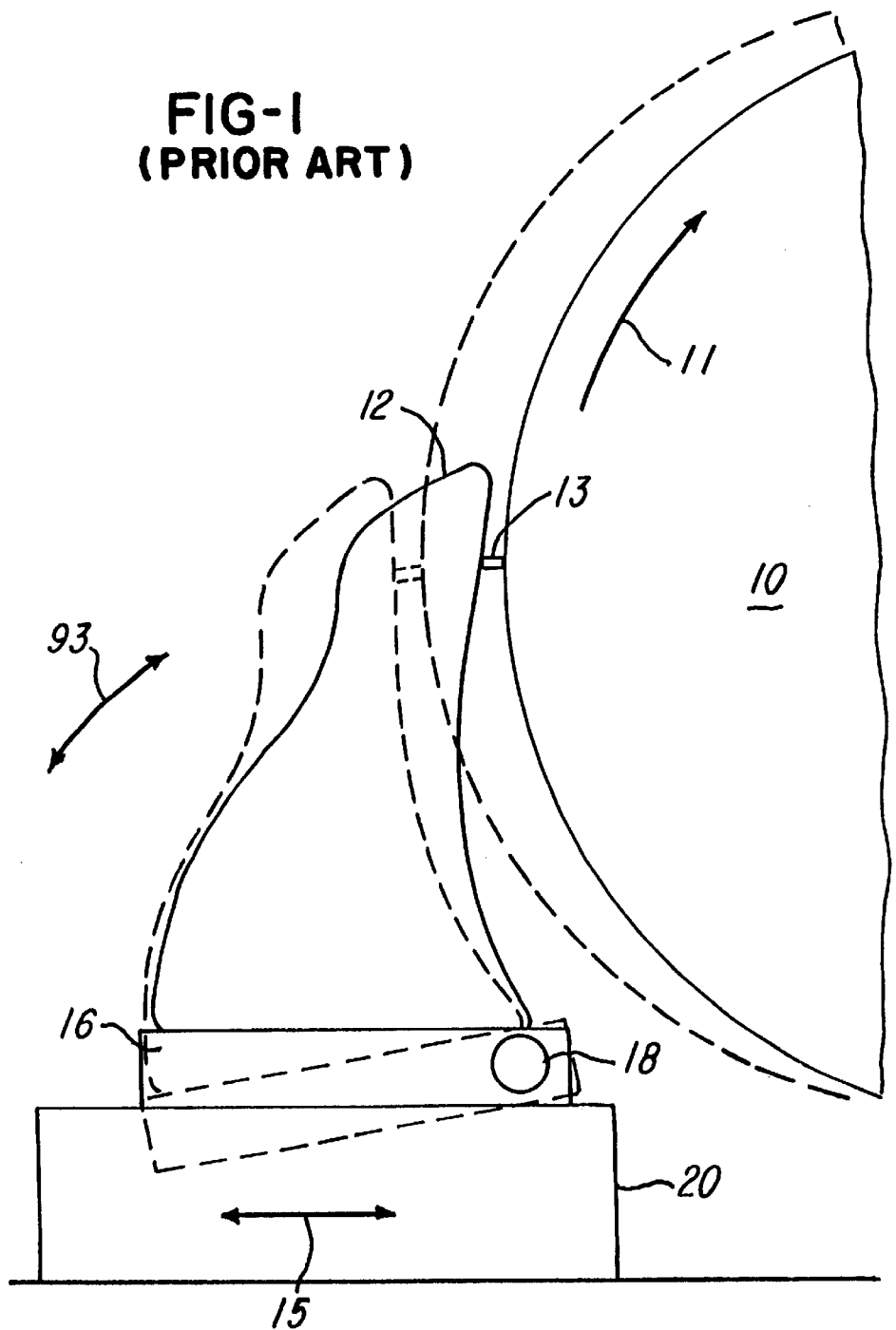
FIG. 1 is a side elevation sketch of a prior art support arrangement for an engraving head.
Figure 4B:
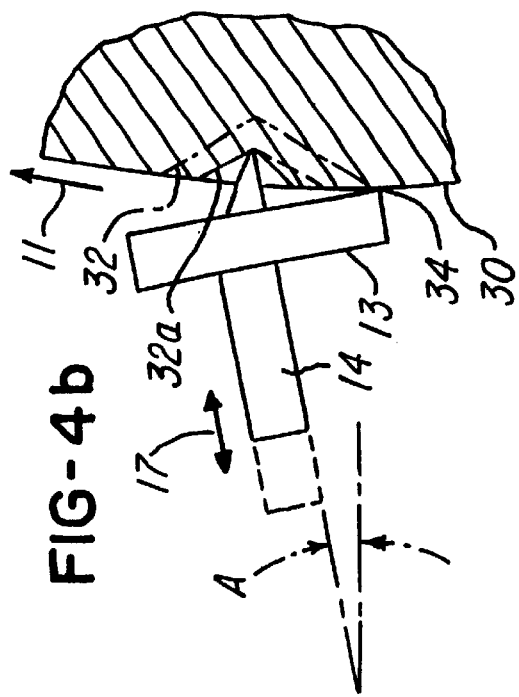
FIG. 4b is a schematic illustration of the engraving action which results when engraving head rotation is permitted to occur.
Figure 4:
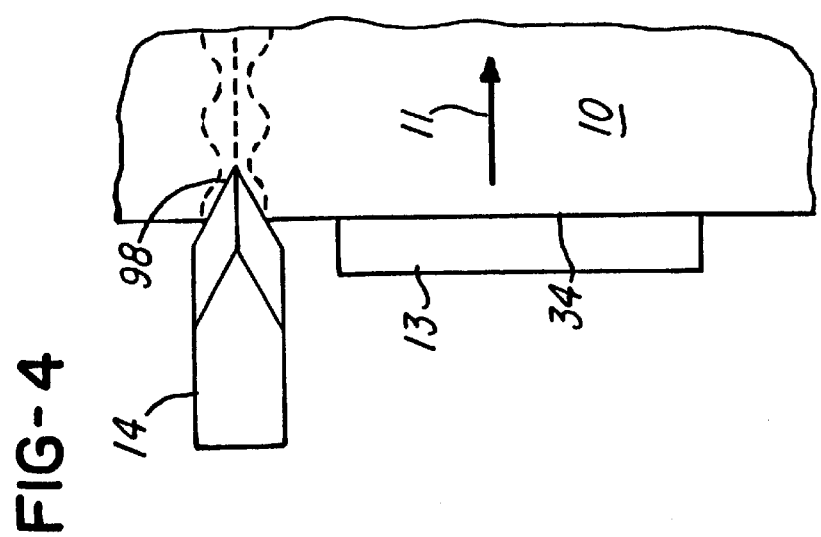
FIG. 4 is a top plan view illustrating the geometrical relationship between an engraving stylus and a guide shoe.

During engraving the guide shoe 13 and stylus 14 may move radially toward and away from the axis of the printing cylinder 10 to accommodate for runout due to the surface condition of the printing cylinder 10. In the embodiment being described, this radial movement is in the order of about 0–0.01 inch, but it could be less or greater if desired. A prior art arrangement as illustrated in FIG. 1, the distance between stylus 14 and axis 18 may be in the order of about 6 inches. Therefore stylus 14 rotates relative to cylinder 10 through an angle of about ½ milliradian. This is illustrated in exaggerated form by the angle A of FIG. 4b. Such rotation of stylus 14 causes an alteration of the engraving action. Thus, stylus 14 may engrave cavities as illustrated by the phantom line 32a whereas cavities 32 are desired.

Platform 50 comprises a deck 15 supported upon a base 24 by a front support column 22a and a rear support column 22b. Preferably the support columns are secured fast to the deck 20 and base 24 at fixed points of attachment. Support columns 22a and 22b are of matching construction and may be flexed to accommodate parallel motion of engraving head 12. In the unstressed or rest position, columns 22a and 22b extend perpendicularly between deck 15 and base 24. Base 24 is connected to a suitable driving mechanism (not illustrated) operative in the direction indicated by the double arrows 25 for driving platform 50 from a rest position to an operating position shown in solid lines in FIG. 2. A compression spring 26 maintains guide shoe 13 in contact with printing cylinder 10 during normal operation. Thereafter guide shoe 13 maintains contact with the surface of cylinder 10 by linear movement only (as shown in exaggerated form by the dotted lines in FIG. 2).

Figure 3:
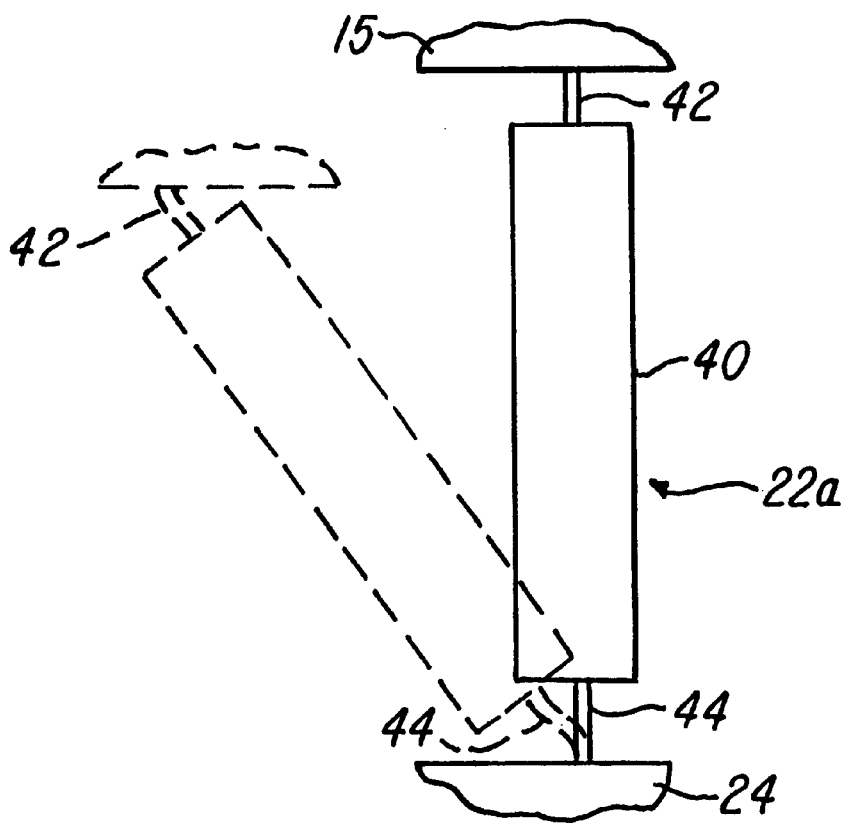
FIG. 3 is an enlarged view of a portion of FIG. 2.

FIG. 3 illustrates front support column 22a in more detail. In the illustrated embodiment, support column 22a comprises a beam 40, an upper leaf spring 42 and a lower leaf spring 44. Upper leaf spring 42 may be fabricated from spring steel and joins deck 15 to beam 40. Lower leaf spring 44 is likewise of spring steel construction and joins beam 40 to base 24. Beam 40 may be a rigid member, if desired. Alternatively, beam 40 and leaf springs 42,44 could be replaced by a single leaf spring. During translation of deck 15, leaf springs 42,44 are flexed as indicated by the dotted lines in FIG. 3.

Figure 5:
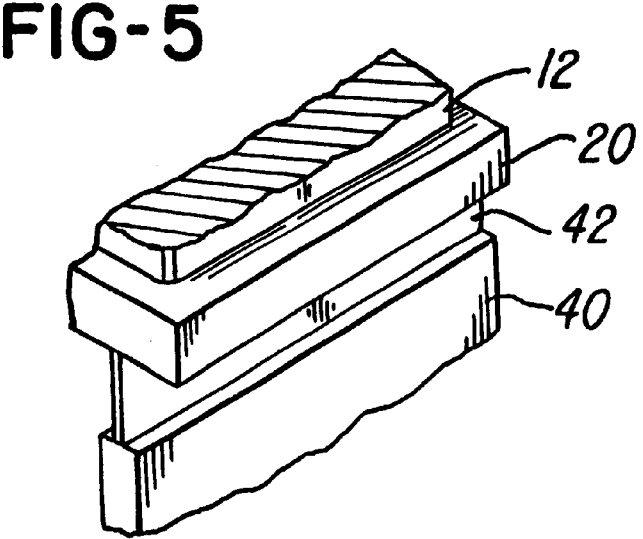
FIG. 5 is a perspective view of the upper end of a front support column.

FIG. 5 illustrates the front upper leaf spring 42 in perspective. It will be seen that leaf springs 42,44 and beam 40 extend a substantial distance in a direction parallel to cylinder axis 45 so as to inhibit flexing of support columns 22a, 22b in that direction. It will be understood, however, that base 24 is attached to a carriage (not illustrated) which is driven in a controlled manner in a direction parallel to the axis 45. It is desired that motion of stylus 14 in the direction of the cylinder axis be restricted to that which is imparted by a carriage 27 (FIG. 2) on which the base 24 is mounted.

Figure 6:
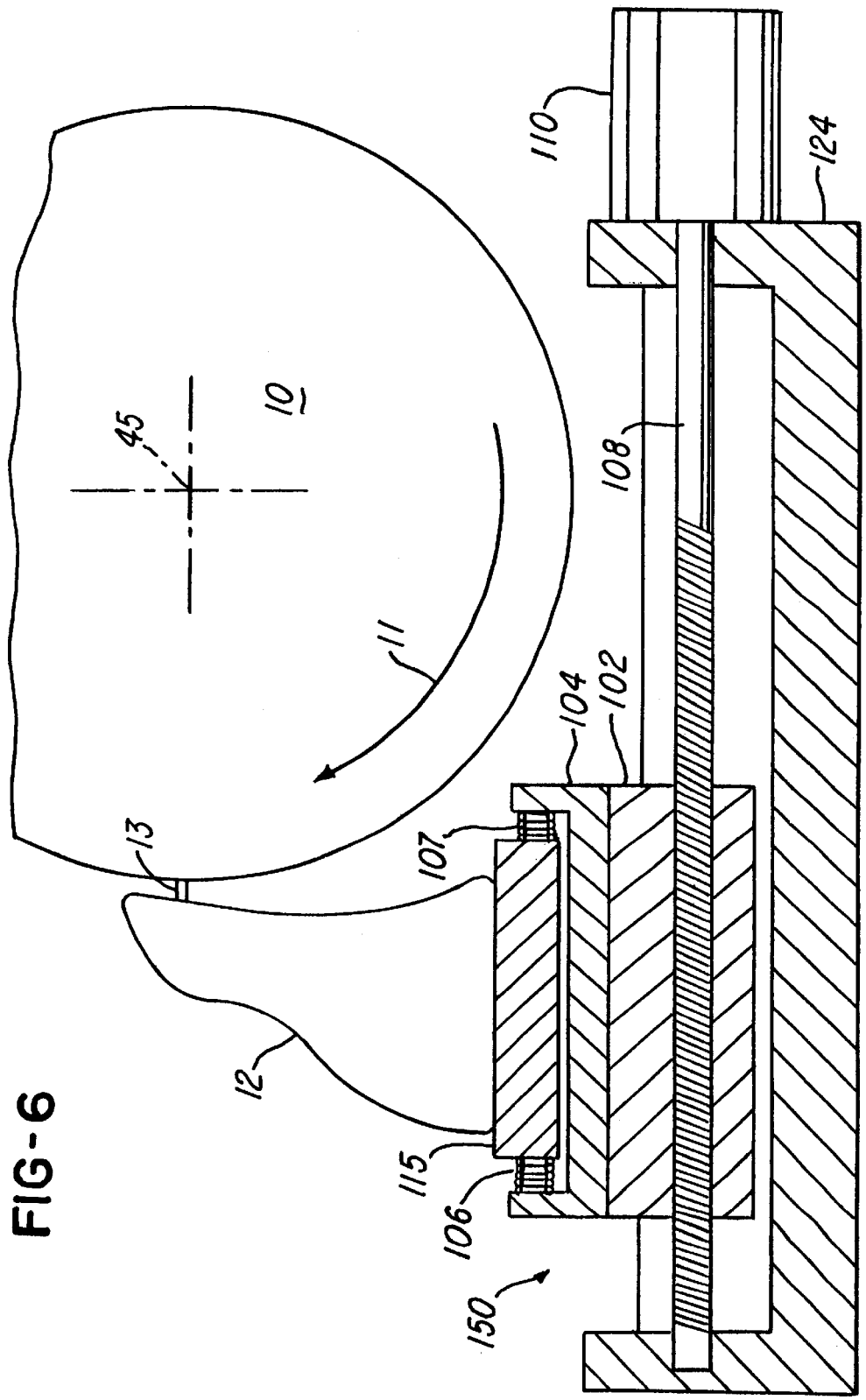
FIG. 6 is a cross-sectioned side elevation view of a second embodiment of an engraving head support arrangement.
Figure 8:
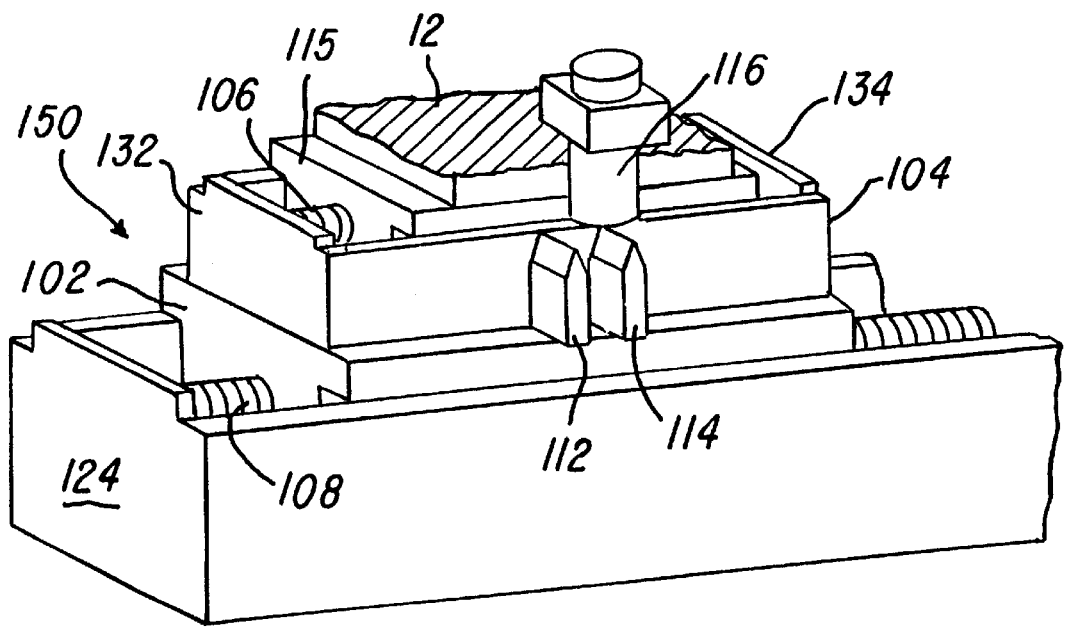
FIG. 8 is a perspective drawing of the support arrangement of FIG. 6.

A second embodiment of the invention may be constructed as generally illustrated in FIGS. 6 and 8. In this embodiment the engraving head 12 is supported by a platform 150 having a base 124 in the form of a track channel. A leadscrew 108 is mounted in base 124 and is driven by a motor 110. A carriage 102 is threadably engaged by leadscrew 108 for horizontal movement in response to rotation of motor 110. Carriage 102 supports a guideway 104 having end walls 132 and 134. Engraving head 12 rests upon a deck 115 supported within guideway 104. A pair of compression springs 106,107 are compressed between deck 115 and end walls 132,134 respectively of guideway 104. As illustrated in FIG. 8, a pair of fingers 112,114 are mounted on a side wall of guideway 104 and are sensed by a proximity sensor 116 supported on deck 115.

The embodiment of FIGS. 6 and 8 is set up by operating motor 110 to move engraving head 12 in a direction toward printing cylinder 10. When guide shoe 13 comes into engagement against the surface of printing cylinder 10, compression spring 106 begins compressing, and fingers 112,114 begin moving relative to proximity sensor 116. Proximity sensor 116 is connected to terminate power to motor 110 when a predetermined movement of fingers 112,114 has been sensed. This causes guide shoe 13 to ride against printing cylinder 10 with a predetermined contact force. The contact force is a function of the spring constants of compression springs 106,107. Preferably, one of springs 106,107 has a stiffness slightly greater than the other, so that a finite contact force is maintained. Preferably, base 124 incorporates bearing tracks (not illustrated) for providing guided linear movement of carriage 102. In the embodiment being described, the bearing tracks may be conventional linear bearing tracks.

Figure 7:
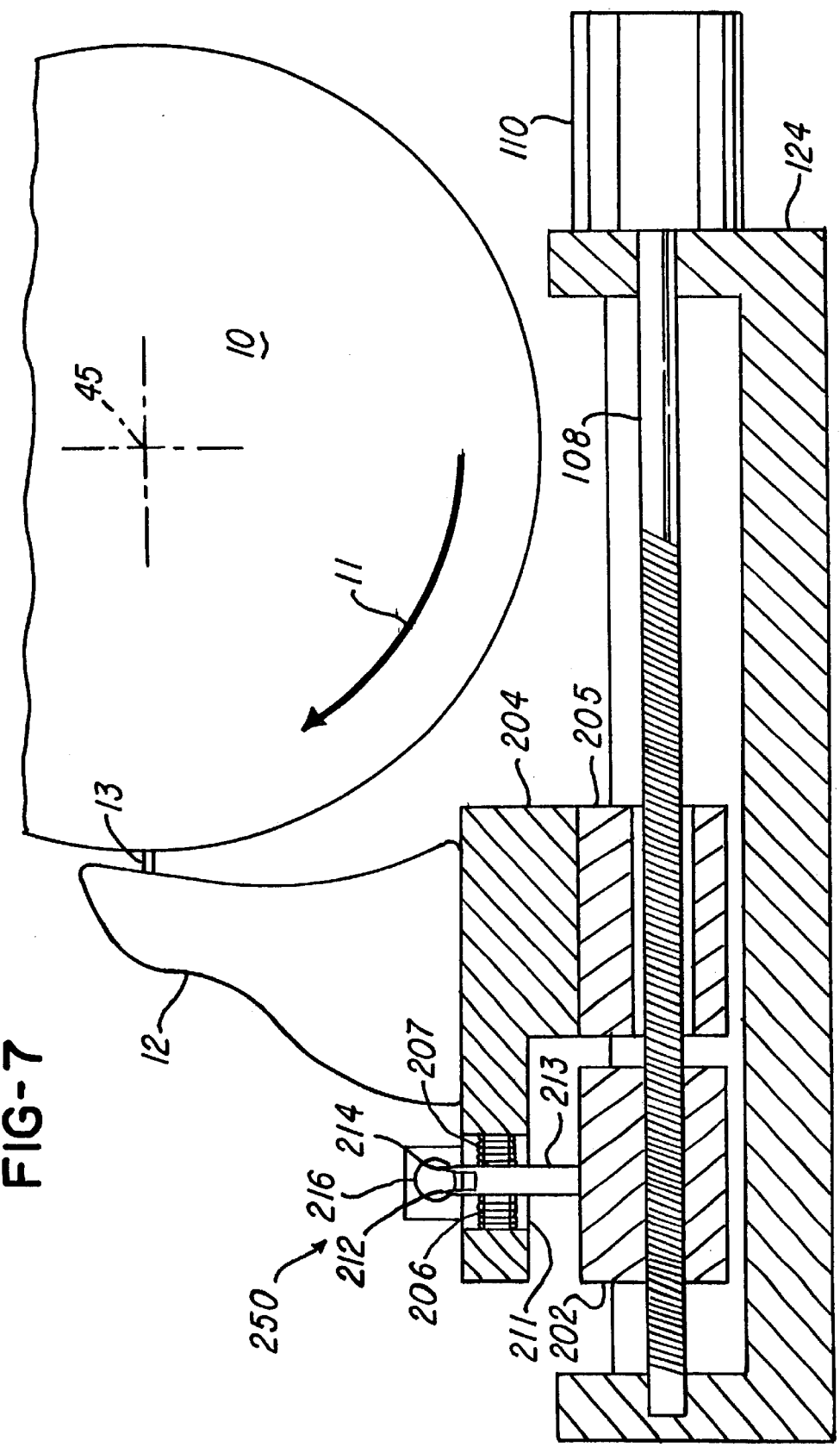
FIG. 7 is a cross-sectioned side elevation view of a third embodiment of an engraving head support arrangement.
Figure 9:
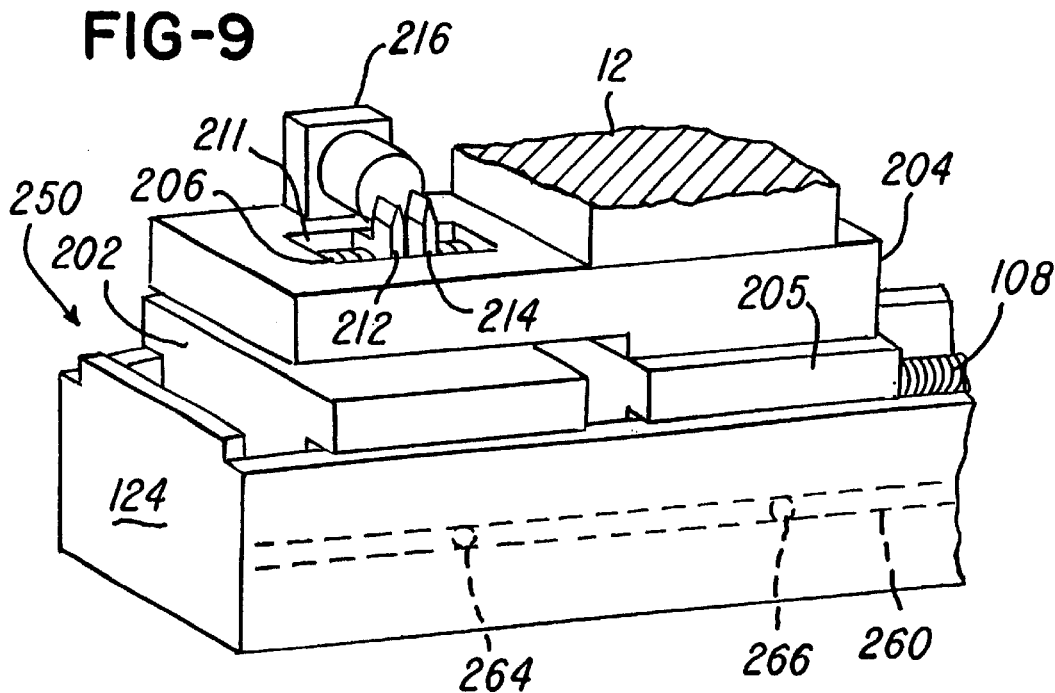
FIG. 9 is a perspective drawing of the support arrangement of FIG. 7.

A third embodiment of the invention is illustrated in FIGS. 7 and 9. The embodiment of those figures is similar to the embodiment of FIGS. 6 and 8 in that it employs a base 124 fitted with a leadscrew 108 driven by a motor 110. A carriage 202 is threadably engaged by leadscrew 108. Carriage 202 drives an upstanding arm 213 which extends upwardly into an opening 211 in deck 204. Deck 204 is mounted on a table 205 which receives, but does not engage, leadscrew 108. Carriage 202 and table 205 may have bearings 264,266 respectively which ride within a track 260 in base 124. A second track and other bearings (not illustrated) may be provided opposite track 260 and bearings 264,266.

Deck 204 supports engraving head 12 and is driven by forces exerted upon a pair of compression springs 206,207 by arm 213. Arm 213 is upwardly terminated by a pair of fingers 212,214 which are sensed by a proximity sensor 216. Proximity sensor 216 is supported by deck 204 so as to sense relative movement of fingers 212,214 which occurs during setup when guide shoe 13 comes into contact with the surface of printing cylinder 10. As with the previously discussed embodiment, a predetermined relative movement of fingers 212,214 causes proximity sensor 216 to disconnect power from motor 110. Again, guide shoe 13 rests against the surface of cylinder 10 with a predetermined force.

An engraving head platform according to the present invention eliminates the prior art head pivoting mechanism while improving engraving accuracy. Advantageously, the guide shoe may be brought into direct contact with a rotating printing cylinder without any need for manual setup.

While the form of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A method for engraving a cylinder mounted on an engraver comprising the steps of:

rotating the cylinder on said engraver;

driving an engraving head without tilting said engraving head in a direction which is substantially perpendicular to an axis of said cylinder until a shoe on said engraving head comes into contact with said cylinder and without tilting said engraving head;

driving said engraving head in a direction parallel to said axis of said cylinder; and oscillating a stylus into engraving contact with said cylinder to effect engraving said cylinder.

2. The method as recited in claim 1 wherein said method further comprises the steps of:

situating said engraving head on a base;

preventing movement of said engraving head relative to said base in a direction which is parallel to said axis of said cylinder.

3. The method as recited in claim 1 wherein said method further comprises the steps of:

situating said engraving head on a deck which is coupled to a base;

permitting said deck to move relative to said base so that said engraving head can be driven towards and away from said cylinder.

4. The method as recited in claim 1 wherein said method further comprises the step of:

driving said engraving head until said shoe engages said cylinder with a predetermined amount of force.

5. The method as recited in claim 1 wherein said method further comprises the steps of:

driving said engraving head with a motor;

terminating power to said motor when said shoe engages said cylinder with a predetermined amount of force.

6. The method as recited in claim 1 wherein said method further comprises the step of:

providing a motor which drives said engraving head until said shoe engages said cylinder with a predetermined amount of force.

7. A method for engraving a cylinder mounted on an engraver comprising the steps of:

rotating the cylinder on said engraver;

driving an engraving head in a direction which is substantially perpendicular to an axis of said cylinder until a shoe on said engraving head comes into contact with said cylinder;

driving said engraving head in a direction parallel to said axis of said cylinder;

oscillating a stylus into engraving contact with said cylinder to effect engraving of said cylinder;

driving said engraving head with a motor;

terminating power to said motor when said shoe engages said cylinder with a predetermined amount of force;

wherein said method further comprises the step of:

sensing movement of said engraving head relative to a base on which said engraving head is mounted; and performing said terminating step when said predetermined amount of force is achieved.

8. The method as recited in claim 7 wherein said method further comprises the step of:

performing said sensing step using a proximity sensor.

9. The method as recited in claim 7 wherein said engraving head is mounted on a deck which is coupled to a base; said method further comprising the steps of:

driving said engraving head towards said cylinder until said shoe engages said cylinder and said deck moves relative to said base;

continuing to drive said base until said shoe engages said cylinder with a predetermined amount of force.

10. The method as recited in claim 9 wherein said method further comprises the step of:

providing an engraving head mounted on said deck which is coupled to said base using a plurality of springs.

11. A method of supporting an engraving head which is driven substantially parallel to an axis of a cylinder during engraving, comprising the steps of:

providing an engraving head;

providing a carriage that permits said engraving head to move in a direction which is substantially perpendicular to said axis of said cylinder; and providing a power-operated drive motor for driving said engraving head until a shoe mounted on said engraving head engages said cylinder with a predetermined amount of force and without tilting said engraving head;

said engraving head engraving said cylinder when said carriage is driven in said direction which is substantially parallel to said axis of said cylinder.

12. The method as recited in claim 11 wherein said method further comprises the steps of:

providing an engraving head mounted on a base;

providing a support which does not permit movement of said engraving head relative to said base in a direction which is parallel to said axis of said cylinder.

13. The method as recited in claim 24 wherein said method further comprises the steps of:

providing said engraving head mounted on a deck which is coupled to a base;

providing a coupling between said deck and said base which permits said deck to move radially relative to said cylinder.

14. The method has recited in claim 11 wherein said method further comprises the step of:

providing said power-operated drive motor which drives said engraving head until said shoe engages said cylinder with said predetermined amount of force;

terminating power to said power-operated drive motor when said shoe engages said cylinder with said predetermined amount of force.

15. A method of supporting an engraving head which is driven substantially parallel to an axis of a cylinder during engraving, comprising the steps of:

providing an engraving head;

providing a carriage that permits said engraving head to move in a direction which is substantially perpendicular to said axis of said cylinder;

providing a drive motor for driving said engraving head until a shoe mounted on said engraving head engages said cylinder with a predetermined amount of force;

providing said engraving head mounted on a deck which is coupled to a base; and providing a coupling between said deck and said base which permits said deck to move radially relative to said cylinder;

wherein said coupling comprises a plurality of springs.

16. A method of supporting an engraving head which is driven substantially parallel to an axis of a cylinder during engraving, comprising the steps of:

providing an engraving head;

providing a carriage that permits said engraving head to move in a direction which is substantially perpendicular to said axis of said cylinder; and providing a drive motor for driving said engraving head until a shoe mounted on said engraving head engages said cylinder with a predetermined amount of force;

terminating power to said drive motor when said shoe engages said cylinder with said predetermined amount of force;

wherein said method further comprises the steps of:

providing a sensor for sensing movement of said engraving head relative to a base on which said engraving head is mounted; and performing said terminating step when said predetermined amount of force is achieved.

17. The method as recited in claim 16 wherein said method further comprises the step of:
providing a proximity sensor as said sensor.

18. The method as recited in claim 16 wherein said method further comprises the steps of:
providing an engraving head mounted on a deck which is coupled to a base;
driving said engraving head towards said cylinder until said shoe engages said cylinder and said deck moves relative to said base;
continuing to drive said base until said shoe engages said cylinder with a predetermined amount of force.

19. A method of supporting an engraving head which is driven substantially parallel to an axis of a cylinder during engraving, comprising the steps of:
providing an engraving head;
providing a carriage that permits said engraving head to move in a direction which is substantially perpendicular to said axis of said cylinder; and
providing a drive motor for driving said engraving head until a shoe mounted on said engraving head engages said cylinder with a predetermined amount of force;
providing an engraving head mounted on a deck which is coupled to a base;
driving said engraving head towards said cylinder until said shoe engages said cylinder and said deck moves relative to said base;
continuing to drive said base until said shoe engages said cylinder with a predetermined amount of force; and
wherein said method further comprises the step of:
providing said engraving head mounted on said deck which is coupled to said base with a plurality of springs.

20. An engraving head drive system for use on an engraver comprising:
an engraving head comprising a stylus for engraving a cylinder as the cylinder rotates;
a deck for supporting said engraving head;
a platform and a support for flexibly coupling said deck to said platform; and
a driver coupled to said engraving head for driving said engraving head toward and away from said cylinder; said driver being power operated;
said driver driving said engraving head towards said cylinder during rotation of the cylinder and without tilting said engraving head to permit said stylus to engrave a surface of said cylinder;
wherein said support comprises a plurality of support columns;
wherein at least on of said plurality of support columns comprises a stiffness which is greater than a stiffness of another of said plurality of support columns.

21. An engraver comprising:
an engraving head situated on the engraver for engraving a cylinder, said engraving head having at least one stylus for engraving said cylinder; and
a driver for non-pivotally moving said engraving head towards and away from said cylinder without tilting said engraving head;
wherein said driver drives said engraving head toward said cylinder when said driver is energized until said engraving head engages said cylinder, said cylinder and said engraving head being moved relative to each other wherein said cylinder is rotating to permit said engraving head to engrave said cylinder;
wherein said support comprises a plurality of support columns; and
wherein at least one of said plurality of support columns comprises a stiffness which is greater than a stiffness of another of said plurality of support columns.

22. An engraver comprising:
an engraving head situated on the engraver for engraving a cylinder, said engraving head having at least one stylus for engraving said cylinder; and
a driver for non-pivotally moving said engraving head towards and away from said cylinder without tilting said engraving head;
wherein said driver drives said engraving head toward said cylinder when said driver is energized until said engraving head engages said cylinder, said cylinder and said engraving head being moved relative to each other while said cylinder is rotating to permit said engraving head to engrave said cylinder;
wherein said engraving head comprises a shoe; said driver driving said engraving head until said shoe engages said cylinder with a predetermined force.

23. An engraver comprising:
an engraving head situated on the engraver for engraving a cylinder, said engraving head having at least one stylus for engraving said cylinder; and
a driver for non-pivotally moving said engraving head towards and away from said cylinder without tilting said engraving head;
wherein said driver drives said engraving head toward said cylinder when said driver is energized until said engraving head engages said cylinder, said cylinder and said engraving head being moved relative to each other while said cylinder is rotating to permit said engraving head to engrave said cylinder;
wherein said engraving head comprises a shoe; said driver being capable of driving said engraving head until said shoe contacts said cylinder during rotation of the cylinder.

24. The engraver as recited in claim 23 wherein said driver is a power-operated motor and said engraver comprises a sensor coupled to said driver;
said sensor terminating power to said power-operated motor when a shoe or said engraving head contacts a surface of the cylinder with a predetermined force.

25. The engraver as recited in claim 24 wherein said sensor is a proximity sensor.

26. The engraver as recited in claim 23 wherein said cylinder is rotated during engraving, said driver comprising a motor drivingly coupled to a leadscrew;
said engraving head being threadably coupled to said leadscrew so that when said motor is energized to drive said leadscrew, said engraving head is either driven towards or away from said cylinder.

* * * * *